US007834877B2

(12) United States Patent
Voorhees et al.

(10) Patent No.: US 7,834,877 B2
(45) Date of Patent: Nov. 16, 2010

(54) SYSTEM-WIDE CONTENT-SENSITIVE TEXT STYLIZATION AND REPLACEMENT

(75) Inventors: Garald L. Voorhees, St. Petersburg, FL (US); Ralph Ernest Ocampo, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 47 days.

(21) Appl. No.: 11/673,678

(22) Filed: Feb. 12, 2007

(65) Prior Publication Data

US 2007/0195096 A1    Aug. 23, 2007

Related U.S. Application Data

(60) Provisional application No. 60/766,782, filed on Feb. 10, 2006.

(51) Int. Cl.
*G06T 11/00* (2006.01)
*G09G 5/22* (2006.01)

(52) U.S. Cl. ..................................... 345/467
(58) Field of Classification Search ................ 345/467, 345/471; 348/62
See application file for complete search history.

(56) References Cited

U.S. PATENT DOCUMENTS

| | | | |
|---|---|---|---|
| 5,467,448 A | 11/1995 | Hilton et al. | |
| 5,502,839 A | 3/1996 | Kolnick | |
| 5,860,073 A | 1/1999 | Ferrel et al. | |
| 5,870,608 A * | 2/1999 | Gregory | 717/131 |
| 6,077,080 A | 6/2000 | Rai | |
| 6,126,447 A | 10/2000 | Engelbrite | |
| 6,230,173 B1 | 5/2001 | Ferrel et al. | |
| 6,665,842 B2 * | 12/2003 | Nielsen | 715/269 |
| 6,771,291 B1 | 8/2004 | DiStefano, III | |
| 6,920,633 B1 * | 7/2005 | Venkatraman et al. | 718/104 |
| 6,992,782 B1 * | 1/2006 | Yardumian et al. | 358/1.13 |
| 7,188,313 B2 * | 3/2007 | Hughes et al. | 715/263 |
| 2002/0011990 A1 * | 1/2002 | Anwar | 345/173 |
| 2002/0124026 A1 | 9/2002 | Weber | |
| 2003/0222904 A1 | 12/2003 | Allor | |
| 2004/0041818 A1 | 3/2004 | White et al. | |
| 2005/0032027 A1 | 2/2005 | Patton et al. | |

(Continued)

OTHER PUBLICATIONS

Blenkhorn, P. Evans, D.G., and Baude, A., Full-Screen Magnification for Windows Using DirectX Overlays, Dec. 2002, IEEE Transactions on Neural Systems and Rehabilitation Engineering, [see also IEEE Trans. on Rehabilitation Engineering], vol. 10, Issue: 4, pp. 225-231.*

(Continued)

*Primary Examiner*—Jeffery A Brier
(74) *Attorney, Agent, or Firm*—Anton J. Hopen; Smith & Hopen, P.A.

(57) ABSTRACT

System-wide content-based text stylization by establishing an array of predefined stylization criteria, intercepting text output generated by an operating system to a graphics device driver, rasterizing the text according to the predefined stylization criteria and passing the rasterized images to the graphics device driver for display. The array of predefined stylization criteria includes criteria that modify font size, font type, font color, font highlighting, underline, bold, italics and invoke character replacement. Stylization may be based on parameters such as syllables, consonants, vowels, and punctuation and/or applied by a lookup table against predefined strings.

14 Claims, 3 Drawing Sheets

U.S. PATENT DOCUMENTS

2005/0149942 A1* 7/2005 Venkatraman et al. ...... 719/310
2005/0231324 A1* 10/2005 Song ......................... 340/7.56

OTHER PUBLICATIONS

Cowan, D.D, German, D.M., Lucena, C.J.P, and von Staa, A., Enhancing Code for Readability and Comprehension Using SGML, Sep. 19-23, 1994, International Conference on Software Maintenance, 1994. Proceedings., pp. 181-190.*

Jeff Collins, MAGic 8.02 Screen Magnification with Speech English release update now available to authorized users via free download, St. Petersburg, Florida—May 30, 2003, pp. 1-2.*

Internet Article, www.freelists.org/srchives/program-1/11-2005/msg00441.html, Feb. 2007.

Microsoft Corporation, "Driver Chain Manager", Apr. 2005, p. 1-9, http://msdn2.microsoft.com/en-us/library/ms971320(d=printer).aspx.

Supplementary European Search Report for application No. EP07750665.7, dated Mar. 24, 2010.

Wolfsthal, Style Control in the Quill Document Editing System, Software Practice & Experience, 1991, vol. 21, No. 6, pp. 625-638.

IBM Corp., Automatic Selection of a Transformation Graph Based on User Criteria, IBM Technical Disclosure Bulletin, 1991, vol. 34, No. 6, pp. 157-158.

IBM Corp., Specification of Default Formatting Information in a Computer Application Profile, IBM Technical Disclosure Bulletin, 1989, vol. 32, No. 3A, pp. 210-211.

Olsen et al., Workspaces : An Architecture for Editing Collections of Objects, Proceedings of the Conference on Human Fcators in Computing Systems, May 3, 1992, pp. 267-272.

International Search Report for PCT/US07/03843, dated Jun. 24, 2008.

* cited by examiner

SYSTEM-WIDE CONTENT-SENSITIVE TEXT STYLIZATION AND REPLACEMENT

CROSS REFERENCE TO RELATED APPLICATIONS

This application claims priority to U.S. Provisional Patent Application No. 60/766,782, entitled: "Low Vision Graphic User Interface Enhancement," filed by the same inventors on Feb. 10, 2006.

FIELD OF INVENTION

This invention relates to low vision and educational text presentation methods, specifically a system-wide method of modifying text style and string output.

BACKGROUND OF THE INVENTION

Content-sensitive text stylization has traditionally been limited to individual software applications. U.S. Patent Publication No. 2005/0032027 to Patton et al. describes a method for color-coding text for educational purposes. However, the '027 publication is limited to a proprietary software application. Thus, text displayed in other software applications have no such stylization for the user.

Content-sensitive text stylization has traditionally been deployed for learning purposes such as reading education. Vowels may be colored different than consonants. While the educational value of this technique is recognized, individuals with vision problems would benefit from content-sensitive text stylization as well. For example, to a low-vision user the numeral six character ("6") may appear indistinguishable from a lower case "b." Thus, a computer program may be instructed to display the numeral six in a unique color, font, or the like to distinguish itself from the lower case "b" to the low-vision user.

Unfortunately, for the low-vision user, such functionality has been limited to proprietary reading programs. What is needed is a method for modifying text output responsive to content across an entire operating system and the applications which run on that platform.

SUMMARY OF INVENTION

The present invention is a system-wide content-based text stylization method. Whereas content-based stylization in the prior art was limited to single, proprietary software applications the present invention operates on a kernel level to provide universal output across any application that renders a non-bitmapped font. The techniques for invoking system-wide stylization include, but are not limited to, driver chaining, cross-process messaging and exposed user interface controls such as that known under the brand name of ACTIVE ACCESSIBILITY provided by MICROSOFT CORPORATION.

Screen reading and screen magnification software essentially locate the display driver, get the information needed for it, then pass the sometimes modified Display Driver Interface (DDI) calls to the original display driver. (Certain remote control software also uses this technique to intercept information being passed to a remote computer.) The DDI interception technique is called driver chaining (also known as hooking video).

The stylization itself may include modifying the font type (i.e., from Arial to Times New Roman), font color, font size, and font highlighting (foreground color). In addition, other stylizations include underlining, bolding, and applying italics. For the purposes of this specification, stylization also includes character replacement.

Stylization is invoked upon the trapped text meeting certain predefined criteria. This criteria may include detecting syllables, consonants, vowels and punctuation. For example, individual syllables may be distinctly colorized to assist in pronunciation. This is accomplished primarily through referencing a dictionary and the division of syllables. Words not in the dictionary are divided by use of a heuristic to determine property syllable separation. Optionally, when the heuristic is used enhancements are differentiated to allow the user to know that this is derived rather than pulled from the dictionary.

Predefined characters or collections of characters (strings) may be stored in a dictionary (as in the syllable example above) with predefined stylization settings. Users may modify both the dictionary and the stylization applied to each dictionary entry. Stylization may be toggled on and off by the user as needed or adjusted to granular settings. For example, stylize punctuation but not vowels. In addition, users may establish their own defined stylization criteria schemes which may be saved and invoke responsive to user commands. Furthermore, users may assign specific stylizations to different windows. For example, a user may want vowels colorized in a document window but not in an application menu or control object.

The Graphics Device Interface (GDI, sometimes called Graphical Device Interface) is one of the three core components or "subsystems", together with the kernel and the user (window manager), of MICROSOFT WINDOWS. GDI is a MICROSOFT WINDOWS standard for representing graphical objects including rendering fonts and transmitting them to output devices such as monitors and printers. Display drivers accept instructions from the GDI as to what graphics and text to draw. The present invention intercepts or traps this text, modifies it according to its application logic (parameters such as vowel, consonant, punctuation, syllables and the like) then passes it along to the display driver.

BRIEF DESCRIPTION OF THE DRAWINGS

For a fuller understanding of the invention, reference should be made to the following detailed description, taken in connection with the accompanying drawings, in which.

DETAILED DESCRIPTION

In an embodiment of the invention, a user designates color to indicate consonants, vowels, numbers, punctuation and special characters contained in documents. The user may designate specific colors for certain types or text. In addition, they may set colorization specific to certain characters within a group. For example, they may set specific colors for punctuation as a whole. They may also designate separate colors for periods and commas to help differentiate between them. The user would have these settings on all the time or toggle them on and off. Stylization may include any indicia including underlying, boldness, italics, highlighting and the like.

Figure 1:
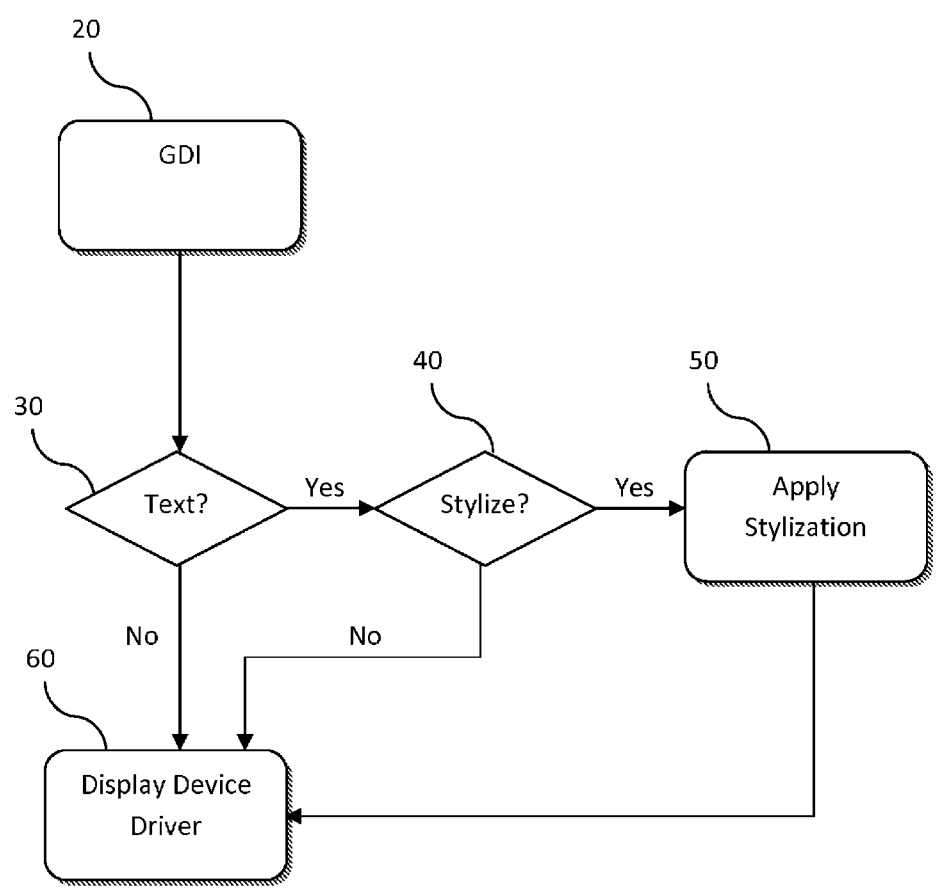
FIG. 1 is a diagrammatic view of an embodiment of the invention intercepting text from the GDI to the display device driver.

In FIG. 1, GDI 20 sends text 30 to be rasterized. The text is evaluated for stylization 40 to determine whether it matches predefined criteria. If it does not match the criteria, then it is sent on to display device driver 60 without modification. If it does match predefined criteria then stylization is applied 50 before eventually getting passed on to display device driver 60.

Figure 2:
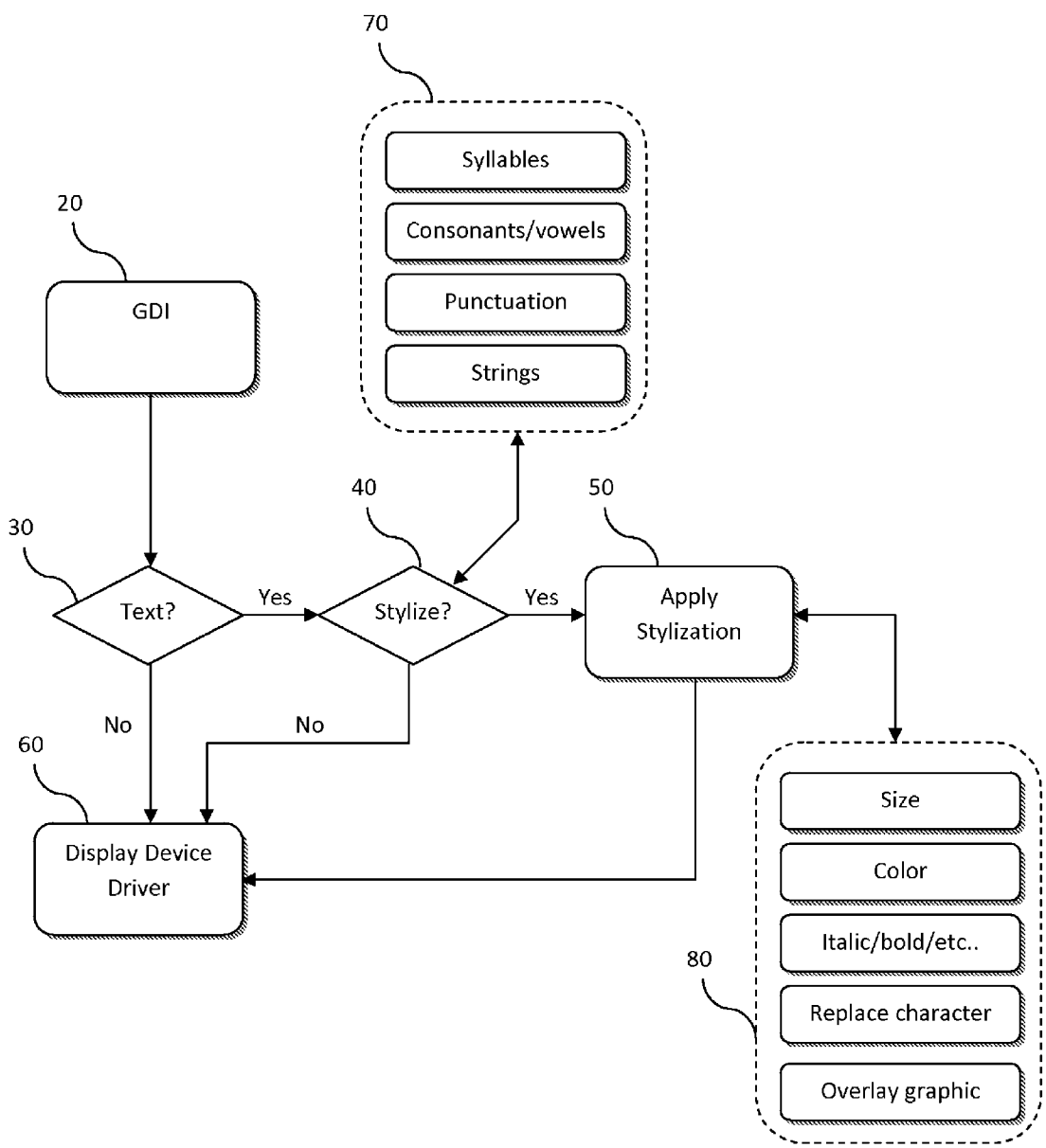
FIG. 2 is a diagrammatic view of an embodiment of the invention intercepting text from the GDI to the display device driver showing arrays of styles and parameters.

In FIG. 2, stylization criteria array 70 is queried for syllables, consonants, vowels, punctuation and/or predefined strings. Stylization array 80 applies styles that are not necessarily mutually exclusive. Such style modifications include size, color, italic, bold, underline, character replace and/or graphic overlay. For graphic overlay, a graphic may be applied over the standard or modified character or string to enhance its visual appearance. Such graphic may be vector generated or bitmap.

Figure 3:
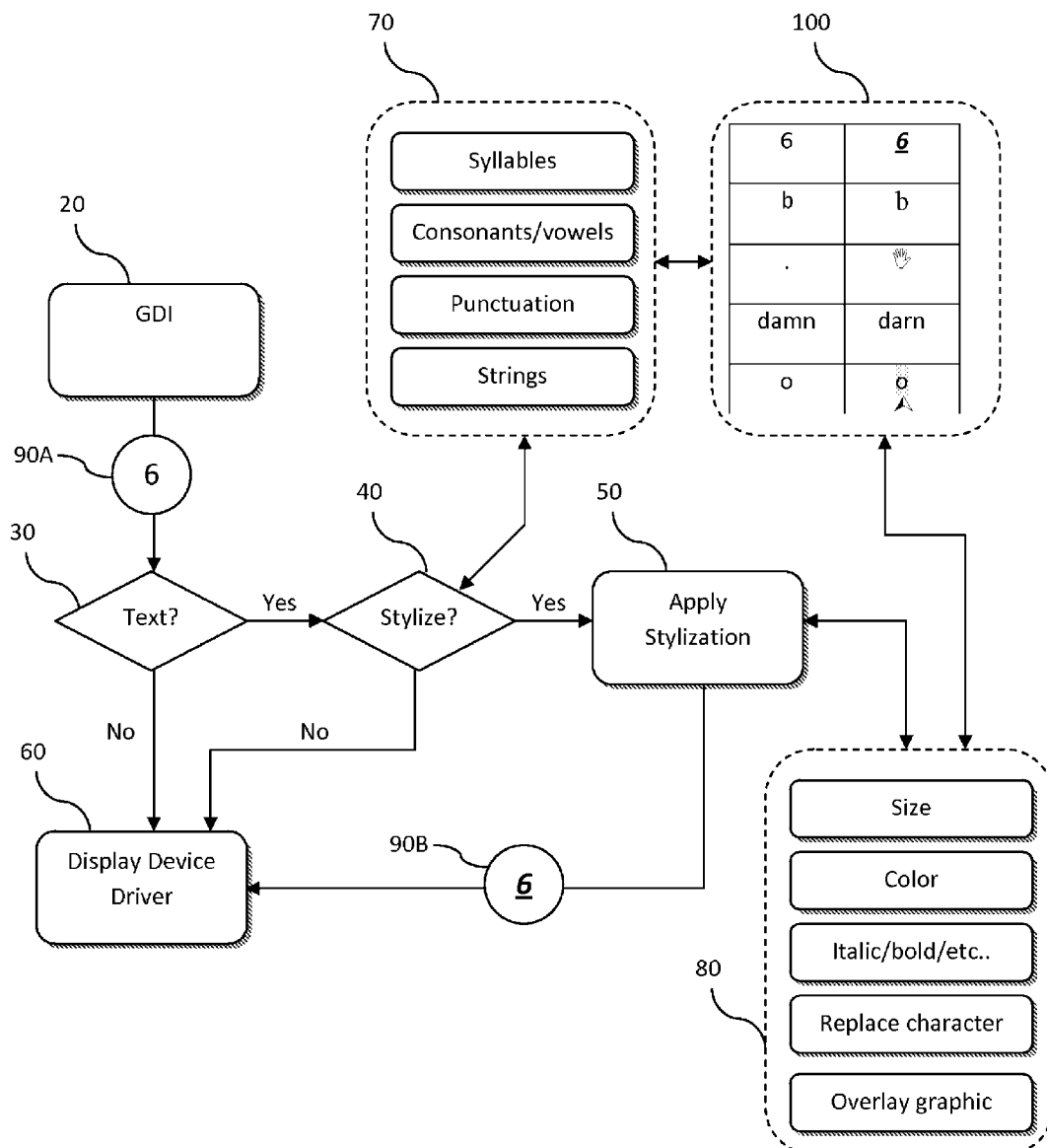
FIG. 3 is a diagrammatic view of an embodiment of the invention showing using a numeric character as an example.

FIG. 3 shows an example of the method applied to the numeral six. GDI 20 instructs display device driver to display the numeral six ("6") denoted as element 90A. However, this instruction is intercepted. Stylization criteria array 70 queries table 100 which maps numeral six 90A to its stylized state which is noted as 90B (bolded, underlined and italic). Display device driver 60 displays numeral six originally as 90A with enhanced stylization as 90B. Table 100 also provides additional examples such as converting font type for any lower case "b" into Times New Roman which may help users distinguish it better from the numeral six. A period is converted into a hand graphic. A potentially objectionable word "damn" is converted into a possibly less objectionable equivalent ("darn"). The vowel "o" is highlighted and overlaid underneath with an up-pointing arrow graphic.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. A method of operating system-wide content-based text stylization comprising the steps of:
   establishing an array of predefined stylization criteria;
   intercepting text sent between a graphics device interface and a display device driver on an operating system;
   evaluating the intercepted text for a character or string of characters;
   modifying a portion of the text matching the character or string of characters, the modification applying the array of predefined stylization criteria to the portion of the text;
   passing the modified text to the display device driver on the operating system for display whereby the modified text is rasterized by the display device driver; and
   displaying the modified text.

2. The method of claim 1 wherein the array of predefined stylization criteria includes criteria selected from the group consisting of font size, font type, font color, font highlighting, underline, bold, italics and character replacement.

3. The method of claim 1 wherein the character or string of characters are selected from the group consisting of syllables, consonants, vowels, and punctuation.

4. The method of claim 1 further wherein the character or string of characters are predefined characters stored in dictionary entries.

5. The method of claim 1 further comprising establishing a user-defined stylization criteria scheme by storing one or more characters and associated stylization settings in a dictionary entry.

6. The method of claim 1 further comprising establishing a plurality of user-selectable stylization criteria schemes whereby a stylization scheme may be invoked responsive to user commands.

7. The method of claim 1 further comprising establishing window-specific application of the text stylization whereby a stylization scheme may be invoked responsive to display of an associated window on a graphic user interface.

8. A computer software product including software executable instructions stored in a non-transitory computer readable medium for performing a method by running a software program on a computer, the method containing instructions for a computer to display system-wide content-based text stylization, the instructions comprising:
   establishing an array of predefined stylization criteria;
   intercepting text sent between a graphics device interface and a display device driver on an operating system;
   evaluating the intercepted text for a character or string of characters;
   modifying a portion of the text matching the character or string of characters, the modification applying the array of predefined stylization criteria to portion of the text;
   passing the modified text to the display device driver on the operating system for display whereby the modified text is rasterized by the display device driver; and
   displaying the modified text.

9. The computer software product of claim 8 wherein the array of predefined stylization criteria includes criteria selected from the group consisting of font size, font type, font color, font highlighting, underline, bold, italics and character replacement.

10. The computer software product of claim 8 wherein the character or string of characters are selected from the group consisting of syllables, consonants, vowels, and punctuation.

11. The computer software product of claim 8 wherein the character or string of characters are predefined characters stored in dictionary entries.

12. The computer software product of claim 8 further comprising instructions for establishing a user-defined stylization criteria scheme by storing one or more characters and associated stylization settings in a dictionary entry.

13. The computer software product of claim 8 further comprising instructions for establishing a plurality of user-selectable stylization criteria schemes whereby a stylization scheme may be invoked responsive to user commands.

14. The computer software product of claim 8 further comprising instructions for establishing window-specific application of the text stylization whereby a stylization scheme may be invoked responsive to display of an associated window on a graphic user interface.

* * * * *